(12) United States Patent  (10) Patent No.: US 7,754,167 B2
Modolo et al.                (45) Date of Patent:     Jul. 13, 2010

(54) METHOD FOR SEPARATING TRIVALENT AMERICIUM FROM TRIVALENT CURIUM

(75) Inventors: Giuseppe Modolo, Jülich (DE); Reinhard Odoj, Gey (DE)

(73) Assignee: Forschungszentrum Julich GmbH, Julich (DE)

( * ) Notice: Subject to any disclaimer, the term of this patent is extended or adjusted under 35 U.S.C. 154(b) by 799 days.

(21) Appl. No.: 10/570,281

(22) PCT Filed: Aug. 14, 2004

(86) PCT No.: PCT/DE2004/001818
§ 371 (c)(1),
(2), (4) Date: Feb. 27, 2006

(87) PCT Pub. No.: WO2005/021810
PCT Pub. Date: Mar. 10, 2005

(65) Prior Publication Data
US 2007/0009410 A1    Jan. 11, 2007

(30) Foreign Application Priority Data
Aug. 25, 2003   (DE) ................ 103 39 328

(51) Int. Cl.
*C01G 56/00* (2006.01)
(52) U.S. Cl. ............... 423/10; 423/184; 423/20; 423/21.1; 423/8; 423/9
(58) Field of Classification Search ............ 423/10, 423/9
See application file for complete search history.

(56) References Cited

U.S. PATENT DOCUMENTS 3,743,696 A * 7/1973 Mason et al. ............. 423/10

(Continued)

FOREIGN PATENT DOCUMENTS

WO    WO 99/14386    3/1999

(Continued)

OTHER PUBLICATIONS

Recent Developments in the aline process for An(III)/L(III) group sepration during the partitioning of minor actinides. Proc Int Conf Radioact Waste Manage Envir International Conference on Radioactive Waste Management and Environmental Remediation.ICEM 2001, vol. 1, 2001, pp. 427-431.*

(Continued)

*Primary Examiner*—Melvin C Mayes
*Assistant Examiner*—Colette Nguyen
(74) *Attorney, Agent, or Firm*—Jonathan Myers; Andrew Wilford

(57) ABSTRACT

A method is disclosed for separating trivalent americium from trivalent curium, coming from an aqueous solution containing at least these cations, wherein, at an acid concentration of 0.01 mol/l-0.3 mogl/l, the aqueous solution is brought into contact with an organic solvent containing a bis(aryl) dithiophosphinic acid having the formula (4)

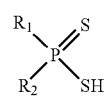

(4)

where $R_1$=phenyl or naphthyl
$R_2$=phenyl or naphthyl,
and radicals of $R_1$ and $R_2$ substituted by at least one methyl, ethyl, propyl, isopropyl-, cyano, nitro, or halo substituent, and containing a synergist having the formula (5)

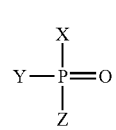

(5)

where X and/or Y and/or Z is R or RO, wherein R is branched or unbranched alkyl.

9 Claims, 2 Drawing Sheets

U.S. PATENT DOCUMENTS

| | | | | |
|---|---|---|---|---|
| 4,318,893 | A | * | 3/1982 | Bathellier et al. .............. 423/10 |
| 5,639,433 | A | * | 6/1997 | Yuan et al. ................. 423/21.5 |
| 5,966,584 | A | * | 10/1999 | Modolo et al. ................. 423/7 |
| 6,312,654 | B1 | * | 11/2001 | Modolo et al. ................. 423/10 |

FOREIGN PATENT DOCUMENTS

| | | | |
|---|---|---|---|
| WO | WO99/14386 | * | 3/1999 |

OTHER PUBLICATIONS 8 th International Conference on Radioactive Waste Management and Environmental Remediation. ICEM 2001. vol. 1, p. 427-431.*

Recent Developments in the Alina Process . . . by Modolo et al.(ICEM' 01, Oct. 2001).

* cited by examiner

METHOD FOR SEPARATING TRIVALENT AMERICIUM FROM TRIVALENT CURIUM

CROSS REFERENCE TO RELATED APPLICATIONS

This application is the US national phase of PCT application PCT/DE2004/001818 filed 14 Aug. 2004 with a claim to the priority of German patent application 10339328.5 itself filed 25 Aug. 2003.

FIELD OF THE INVENTION

The invention relates to a method of separating trivalent americium form trivalent curium in accordance with the preamble of claim 1.

BACKGROUND OF THE INVENTION

The separation of trivalent actinides like americium (Am) or curium (Cu) from trivalent lanthanides has been a problem for a long time. The difficulties derive from the fact that the elements to be separated are very similar chemically and the trivalent ions of lanthanides and actinides also have similar physical properties. Especially the very similar ionic radii contribute to similar properties of both element groups. Thus a large number of investigations have already been carried out to attempt to separate with the highest possible selectivity and high efficiency the trivalent ions of actinides and lanthanides.

It is indeed known that extraction agents with soft donor groups, which contain nitrogen or sulfur as complex-forming structural components have a certain selectivity in liquid-liquid extraction with respect to trivalent actinides but can carry out the separation hitherto only at relatively high pH values at which the trivalent actinides tend toward precipitate formation.

In accordance with the publication K. L. Nash, Solvent Extraction, Ion Exchange. 11(4), 729-768 (1993), the known Talspeak Process is a selective extraction of lanthanides with the aid of complexing agents which hold the trivalent actinides in solution. However, this separation process also requires relatively high pH values of 3 to 4 and requires the addition of further salts.

A process available from the Applicant for the extraction of trivalent actinides from aqueous solutions which contain trivalent actinides and trivalent lanthanides which enable a separation at high acid concentrations of 0.01 to 2 mol/l $HNO_3$ (EP 1 019 552 B1) in accordance with this process, such an acid is aqueous solution which contains a mixture of trivalent lanthanides and actinides, is extracted by means of an organic solvent which contains as the extraction agent, a bis(aryl)dithiophosphinic acid to which a synergist is added. With this method, because of the low pH value or high acid concentration, a precipitation of the trivalent actinides is limited and especially good separation results are obtainable. To evaluate the separation effect, the distribution coefficient D and the separation factor SF are considered.

$$D_{AN(III)}=[AN(III)_{org}]/[An(III)w] \quad (1)$$

In formula 1:
$D_{AN(III)}$=The distribution Coefficient for Trivalent Actinide (dimensionless)
$[AN(III)_{org}]$=Concentration of the Trivalent Actinide in the Organic Phase (mol/l)
$[An(III)w]$=Concentration of the trivalent actinide in the aqueous phase of mol/liter).

$$D_{LN(III)}=[Ln(III)_{org}]/[Ln(III)_w\}] \quad (2)$$

In formula 2:
$D_{LN(III)}$=Distribution Coefficient for a trivalent lanthanide (dimensionless)
$[Ln(III)_{org}]$=Concentration of the trivalent lanthanide in the organic phase (mol/liter)
$[Ln(III)_w\}]$=The concentration of the trivalent lanthanide in the aqueous phase (mol/liter)

$$SF=D_{AN(III)}/D_{LN(III)} \quad (3)$$

SF=Separation Factor (Dimensionless)
With a separation factor of SF=1, no separation is possible.

In accordance with that process using bis(aryl)dithiophosphine acid in strongly acid medium, the separation factor SF between trivalent actinides and trivalent lanthanides, depending upon the synergist, lies between 20 and 2000.

There exist various methods for the separation of the trivalent actinides (An)(III)Am and Cm from highly active liquid wastes, the Raffinate of the Purex Process. Madic, C. In 6$^{th}$ Information Exchange Meeting on Actinide and Fission Product Partitioning and Transmutation, Madrid, Spain, 11-13 Dec. 2000, EUR., 19783, 2001, S. 53 to 64.

In the first step the An III are coextracted together with the lanthanides Ln(3) and the greater part of the fission products (for example Mo, Zr, Cs, Fe, etc. are separated out. The TRUEX, TRPO and the DIAMEX-processes belong to those known processes in all of the these processes (An/III)/Ln(III) such fractions are obtained that require further separation, hitherto with considerable problems. Up to know there has been no extraction agent which can selectively separate An(III) from Ln(III) of strongly acidic solutions. If one thinks of the P & T Nuclear Fuel Circulation in which the long lived actinides are first separated off (Partitioning, P) and then eliminated by transmution T, a An(III)/Ln(III)—separation is impermissible on the following grounds.

About a third of the fission products are lanthanides.
The Ln(III) have the same oxidation state (III) as the An(III) and the chemical characteristics are very similar to those of the AnIII.

Several lanthanides have very large neutron capture cross sections and act as neutron poisons with respect to the transmutation.

In the DIAMEX-Process, the An(III) and Ln(III) are extracted together from the 3 to 4 mol/L $HNO_3$ containing Purex-Raffinate with the aid of melanic acid diamide. After the back extraction with dilute $HNO_3$, one obtains a product which is comprised primarily of the An(III) and Ln(III) as well as an $HNO_3$ concentration of about 0.5 mol/liter (Madic, C.; Hudson, M. J.; Liljenzin, J. O.; Glatz, J. P.; Nannicini, R.; Facchini, A.; Kolarik, Z.; Odoj, R. New partitioning techniques for minor actinides, European report, EUR19149, 2000).

The present Applicant has also developed a method for actinide-lanthanide separation from nitric acid solutions (0.5 to 1.0 mol/liter $HNO_3$) this process is known under the name ALINA for (Actinide (III)-Lanthanide(III) Intergroup separation in Acidic Medium). (Modolo, G.; Odoj, R.; Baron, P. The ALINA Process for An(III)/Ln(III) Group Separation from strong Acidic Medium, Proceedings of Global 99, International Conference on Future Nuclear Systems, Jackson Hole, Wyo., USA, Aug. 29-Sep. 3, 1999; American Nuclear Society, Inc.).

As the extraction agent a mixture of aromatic dithiophosphinic acid and trioctylphosphinic oxide (TOPO) in tertiary butyl benzene is used. Details for the synthesis of the new extraction agent, its radiolitic stability and its suitability for AN(III)/Ln(III) separation are disclosed in (Modolo, G.; Odoj, R. Synergistic selective extraction of actinides (III)

over lanthanides form nitric acid using new aromatic diorganyldithiophosphinic acids and neutral organophosphorus compounds. Solvent Extr. Ion Exch. 1999m 17 (1), S. (33-53).

The separation of Americium and Curium is however still more difficult than Actinide (III)-/Lanthanide (III) separation and has even greater requirements or process chemistry for the following reasons:

In the trivalent state, Americium and Curium have very similar chemical properties based upon their practically identical ionic radii (0.99 or 0.986 Angstrom). Americium is found in its higher oxidation states (IV, V, VI) as a very strong oxidizing agent and the nonhydrometallurgical (liquid-liquid extraction) for example the PUREX process) do not always allow separation of the heterovalent actinide because of the instability of all oxidation states up to the trivalent oxidation state. For that reason the structure does not describe any hydrometallurgical process which can separate americium and curium form one another in their natural oxidation states.

OBJECT OF THE INVENTION

It is therefore the object of the invention to provide a method of separating americium and curium which has an especially high separation factor SF. The new method should also be readily integratable or includable in already known processes for lanthanide-actinide separation.

SUMMARY OF THE INVENTION

With the method of the invention it is possible directly to separate Americium (III) and Curium (III) with a separation factor of the order of magnitude of 10. It enables apart from Americium (III)/Curium (III) separation also an actinide (III)/lanthanide(III) separation.

BRIEF DESCRIPTION OF THE DRAWINGS

Advantageous features of the invention are given in the dependent claims. The figures show by way of example schematic process modes.

They show.

Figure 1:
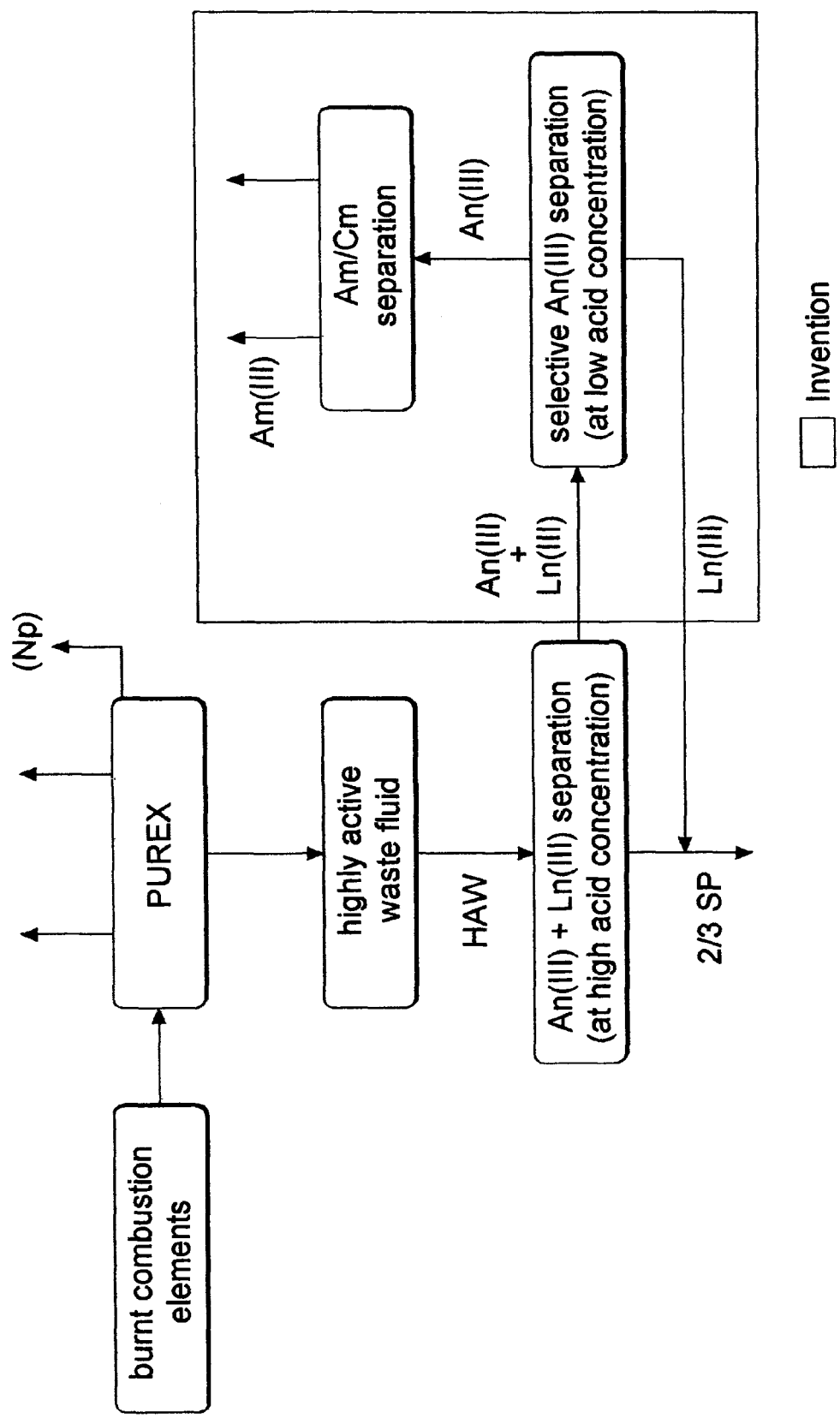
FIG. 1 is a flow diagram of a separation process according to the invention for Americium (III) and Curium (III) connected to a PUREX-process.

According to the method of the invention, the ions of Americium (III) and Curium (III) are separated in an aqueous phase. The solution can then also contain other lanthanides or actinides as well as their components.

For this purpose the aqueous solution containing Americium III and Curium (III) is brought into contact with an organic phase which contains an extraction agent and synergist. As the organic solvent, various systems come into consideration. Thus, a pure solvent as well as solvent mixtures containing at least two solvent components can be used.

Among the solvents which can be used are aromatic solvents, especially those aromatic solvents which are liquid at room temperature like benzol, toluene, tertiary butylbenzol, xylon, xylene, bis or tris-(isopropyl)benzene alone or in mixtures of at least two of these components.

Also branched and/or unbranched aliphatic solvents having a chain length of, for example, $C_5$ to $C_{14}$ and generally room temperature liquid aliphatic solvents can be used alone or in mixtures. Especially n-hexane, c-hexane, haptane, octane, nonane, decane, dodecane, kerosone or TPN must merit consideration.

Preferably the solvent is a mixture of aromatic and aliphatic solvents is used, especially preferably an aromatic solvent, particularly especially preferably as the aromatic component that is greater than 50%.

As solvent, for example, toluene, hexane, a mixture of iso octane and tertiary butylbenzol can be named. The organic solvent is advantageously a solvent containing aromatic component, like benzene, toluene, zylene, tertiary benzene, or a pure aromatic solvent.

In one mode of the invention the solvent used has at least one component from the group of benzol, toluene, xylol, tertiary butylbenzol and bis or tris tertiary butyl benzene and bis or tris isopropyl benzene. The use of a solvent has an additional positive effect in that it additional improves the distribution coefficients of the actinide Am(III) and Cm(III). The separation factor remains constant at about 10.

The sequence of the solvent effectiveness for the distribution coefficients is as follows:

Benzol<Toluene<Xylene<tertiary butyl benzene less than n-hexane/toluene (50/50, Table 4) bis-(isopropyl)benzene, triisopropylbenzene, bis-(tertiary butyl benzene), tris-tertiary tributyl benzene.

The extraction agents which are in the organic phase can preferably include an automatic dithiophosphinic acid, preferably (chlorophenyl)dithiophosphinic acid.

The extraction is carried out generally by means of an organic solvent which contains an extraction agent in the form of a bis(aryl)dithiophosphinic acid the general formula (4) $R_2PS(SH)$

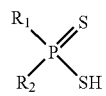

(4)

with $R_1$=phenyl or naphthyl,
$R_2$=phenyl or naphthyl, as well as methyl, ethyl, propyl, isopropyl, cvyano, nitro, halogenyl, (Cl—, F—, Br—, I—) substituted residues of $R_1$ and $R_2$ whereby $R_1$ and $R_2$ can be substituted with at least one component from the group of methyl ethyl isopropyl, cyano, nitro, halogenyl (Cl—, F—, Br—, I—). These groups are for example substituents which increase the acidity of the extraction agent bis(aryl)dithiophosphine acid which give rise to especially good extraction results. Decisive is the increase of the acidity of the extraction agent. The exact positions of the substituents is less significant.

The synergist which is introduced into the organic phase is preferably a trialkylphosphate (Formula (5)) with X, Y, Z=RO, preferably tris(ethylhexyl)phosphate (TEHP) or a trialkyl phosphinic oxide with X, Y, Z=R like for example trioctyl phosphinic oxide (TOPO).

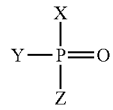

(5)

With X and/or Y and/or Z=RO (alkoxy) or R(alkyl), R can be branched or unbranched and preferably is C4-C10 alkyl. All residues X, Y, Z can be R or RO. However, it is possible that, depending upon the case, only one or two of X, Y, Z will be RO or R.

Especially preferably the organic phase contains at least one synergist from the group comprised of trioctylphosphate (Formula 6)), tris-(2-ethylhexyl)-phosphate (Formula 7) and tris-(2-propylpentyl)-phosphate (Formula (8)).

  (6)

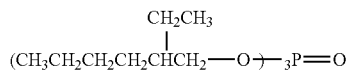  (7)

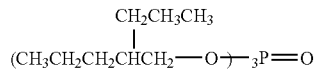  (8)

With the addition of the synergist according to the invention there is a significant increase in the separation factor SF.

The selectivity in the separation of Am(III) from Cm(III) is significantly increased. The separation of Am(III) from Cm(III) is carried out at an acid concentration which is dependent upon the materials and material properties and concentration of the extraction arrangement, the synergist and the solvent The conditions must be so selected that the distribution coefficient of Am(III) is greater than 1 and the distribution coefficient for Cm(III) as a consequence is smaller than 1. Examples of possible acid concentrations for two different solvents for 0.5 mol/liter $(ClPh)_2PSSH+0.15$ mol/L TEHP are given in Table 4. The $H^+$ concentrations can lie between 0.01-1 mol/liter for the separation according to the invention. Preferred is a range between 0.05 and 0.5 mol/liter. As acids, especially Hcl, $H_2SO_4$ can be used by way of example and especially $HNO_3$ is used since $HNO_3$ forms easily soluble salts. With this procedure according to the invention, Am(III) can be separated from Cm(III) both from a solution containing these components alone as well as from a solution which contains additional ions or cations like for example alkali metal elements, alkaline earth metal elements, lanthanides (III) and lanthanides (IV, V, VI).

In the extraction experiments with dithiophosphinic acid for actinide (III)/lanthanide III separation in accordance with the state of the art, up to now it has been found that Americium (III) and Curium(III) have similar properties and the same extraction characteristics, that is similar distribution coefficients and thus $SF_{Am/Cm-1}$. As a result curium(III) was not heretofore considered. The results of the extraction experiments with Curium(III) have shown, astonishingly, a difference in the properties for the first actinide elements. The extraction experiments according to the invention carried out with synthetic actinide(III)/Lanthanide(III) solutions use the compositions in Table 1. These actinide(III)/lanthanide(III) solutions arise in a DIAMEX process for actinide(III) separation from a PUREX raffinate.

TABLE 1

Composition of Concentrated Actinide(III)/Lanthanide(III) solutions from a DIAMEX process traced with Am-241 and Cm-244. The concentrations of the Lanthanides(III) correspond to 2.5 or ten times the expected concentrations. As a result, KF = 2.5 and 10.

| ELEMENT | KF* = 2.5 (MG/L) | KF = 10 (MG/L) |
|---|---|---|
| Am | Trace Amount | Trace Amount |
| Cm | Trace Amount | Trace Amount |
| Y | 229 | 929 |
| La | 670 | 3032 |
| Ce | 1340 | 5926 |
| Pr | 640 | 2690 |
| Nd | 2476 | 10261 |
| Sm | 469 | 1902 |
| Eu | 90 | 367 |
| Gd | 117 | 448 |

*KF = Concentration Factor

The results of extraction experiments are shown in Tables 2 and 3. One can see that the distribution coefficient of Y, Nd, Sm, Eu and Gd are significantly smaller than those of La, Ce and Pr.

Ce is the best extracted Lanthanide. As a consequence, for example, the Am/Eu separation factor is very high ($SF_{Am/Eu}$>1000), but for example the Am/Ce separation factor is only moderate ($SF_{Am/Ce}$=25-40) for continuous An(III)/Ln (III), this separation factor is more than sufficient. Since however the distribution coefficient of the Cm is smaller by a factor of 10 than that of the Am, ($SF_{A/Ce}$) a separation of Cm is also possible.

The results in Table 3 clearly show that with the extraction system $(ClPh)_2PSSH+TEHP$, concentrated An/Ln solutions (KF=10) can be handled. The comparison with the values in Table 2 show that indeed the distribution coefficients of all elements under the same conditions are somewhat smaller but the separation factors $SF_{Am/Eu}$, $SF_{Am/Ce}$, $SF_{Cm/Eu}$ and $SF_{Cm/Ce}$ increase. To be noted are the higher Am/Eu and Am/Gd separation factors of over 2000. The Am/Ce separation factor is 2 orders of magnitude smaller and is 36 to 40. The Am/Cm separation factor is also here about 10. At this point it may be noted that in the literature up to now no separation factor has been cited. Up to now only values below 2 are known.

TABLE 2

Extraction of Am(III), Cm(III) and lanthanides (III) with 0.4 mole/liter $(ClPh)_2PSSH$ and 0.15 mole per liter TEHP in 20% iso-octane/tertiary butylbenzene from a synthetic An(III)/Ln(III) solution.

Organic Phase:

0.4 mole per liter $(ClPh)_2PSSH$ plus 0.15 mole per liter TEHP in 20% iso-octane tertiary butylbenzene.

Aqueous Phase:

Synthetics An(III), Cm(III)
Solution with the composition in Table 1 (KF = 2.5) with various $HNO_3$ concentrations:

| [$HNO_3$] | 0.1 | 0.2 | 0.3 | 0.5 | 1.0 |
|---|---|---|---|---|---|
| | | | Distribution Coefficient D | | |
| Am-241 | 13.65 | 3.68 | 0.83 | 0.14 | 0.013 |
| Cm-244 | 1.20 | 0.27 | 0.084 | 0.016 | 0.0025 |
| Y | 0.0071 | 0.0013 | 0.0005 | 0.0001 | 0.0000 |
| La | 0.42 | 0.093 | 0.019 | 0.0034 | 0.0003 |
| Ce | 0.58 | 0.13 | 0.033 | 0.0046 | 0.0004 |
| Pr | 0.29 | 0.064 | 0.013 | 0.0024 | 0.0002 |
| Nd | 0.079 | 0.0067 | 0.0017 | 0.0006 | 0.0001 |

TABLE 2-continued

| | | | | | |
|---|---|---|---|---|---|
| Sm | 0.017 | 0.0029 | 0.0010 | 0.0002 | 0.0000 |
| Eu-152 | 0.011 | 0.0019 | 0.0008 | — | — |
| Eu | 0.012 | 0.0021 | 0.0007 | 0.0002 | 0.0000 |
| Gd | 0.071 | 0.016 | 0.0043 | 0.0008 | 0.0001 |
| | | Separation Factor SF | | | |
| $SF_{Am/Eu}$ | 1240.9 | 1752.4 | 1012.1 | 636.4 | 183.1 |
| $SF_{Am/Ce}$ | 23.5 | 28.3 | 25.2 | 30.4 | 29.5 |
| $SF_{Am/Cm}$ | 11.4 | 13.6 | 9.9 | 8.7 | 5.2 |
| $SF_{Cm/Eu}$ | 109.1 | 142.1 | 102.4 | 72.7 | 35.2 |
| $SF_{Cm/Ce}$ | 2.1 | 2.1 | 2.5 | 3.5 | |

TABLE 3

Extraction of Am(III), Cm(III) and lanthanides (III) with
0.4 mole/liter $(ClPh)_2PSSH$ and 0.15 mole per liter TEHP in 20% iso-
octane/tertiary butylbenzene from a synthetic An(III)/Ln(III) solution.

Organic Phase:

0.4 mole per liter $(ClPh)_2PSSH$ plus 0.15 mole per liter
TEHP in 20% iso-octane tertiary butylbenzene.
Aqueous Phase:

Synthetics An(III), Cm(III)
Solution with the composition in Table 1 (KF = 10) with
various $HNO_3$ concentrations:

| $[HNO_3]$ | 0.1 | 0.2 | 0.3 | 0.5 | 1.0 |
|---|---|---|---|---|---|
| | | Distribution Coefficient D | | | |
| Am-241 | 13.65 | 3.68 | 0.83 | 0.14 | 0.013 |
| Cm-244 | 1.20 | 0.27 | 0.084 | 0.016 | 0.0025 |
| Y | 0.0071 | 0.0013 | 0.0005 | 0.0001 | 0.0000 |
| La | 0.42 | 0.093 | 0.019 | 0.0034 | 0.0003 |
| Ce | 0.58 | 0.13 | 0.033 | 0.0046 | 0.0004 |
| Pr | 0.29 | 0.064 | 0.013 | 0.0024 | 0.0002 |
| Nd | 0.079 | 0.0067 | 0.0017 | 0.0006 | 0.0001 |
| Sm | 0.017 | 0.0029 | 0.0010 | 0.0002 | 0.0000 |
| Eu-152 | 0.011 | 0.0019 | 0.0008 | — | — |
| Eu | 0.012 | 0.0021 | 0.0007 | 0.0002 | 0.0000 |
| Gd | 0.071 | 0.016 | 0.0043 | 0.0008 | 0.0001 |
| | | Separation Factor SF | | | |
| $SF_{Am/Eu}$ | 1240.9 | 1752.4 | 1012.1 | 636.4 | 183.1 |
| $SF_{Am/Ce}$ | 23.5 | 28.3 | 25.2 | 30.4 | 29.5 |
| $SF_{Am/Cm}$ | 11.4 | 13.6 | 9.9 | 8.7 | 5.2 |
| $SF_{Cm/Eu}$ | 109.1 | 142.1 | 102.4 | 72.7 | 35.2 |
| $SF_{Cm/Ce}$ | 2.1 | 2.1 | 2.5 | 3.5 | |

In Table 4, several extraction results of the Am(III)/Cm(III) separation form nitric acid solution have been given.

The results show that the distribution coefficients are strongly dependent upon the solvent but the Am/Cm separation factor $SF_{Am/Cm}$ is approximately unaffected. The distribution coefficients of Am and Cm (together in solution) are determined by alphaspectroscopy and the Am additionally by gammaspectroscopy. The alphaspectroscopy has the advantage that both nucleides (here Am-241 and Cm-244) can be simultaneously measured.

TABLE 4

Extraction of Am(III)/Cm(III) with 0.5 mole per liter
with $((ClPh)_2PSSH$ and 0.15 mole per liter TEHP depending upon the
solvent.

Organic Phase:

0.5 mole per liter $(ClPh)_2PSSH$ plus 0.15 mole per liter
Tris (ethylhexyl phosphate in various solvents.

TABLE 4-continued

Aqueous Phase:

Tracer accounts of Am-241 and Cm-244, various $HNO_3$
concentrations.
n-hexane/toluene (50/50 as solvent)
Toluene as Solvent

| $[HNO_3]$ | $D_{Am(\alpha)}$ | $D_{Am(\alpha)}$ | $D_{Cm(\alpha)}$ | $SF_{Am(\alpha)/Cm(\alpha)}$ |
|---|---|---|---|---|
| | N-haxane/Toluene (50/50 as solvent) | | | |
| 0.1 | 133.697 | 155.50 | 16.2778 | 9.553 |
| 0.2 | 12.613 | 8.3936 | 1.0928 | 7.681 |
| 0.5 | 0.5538 | 0.2654 | 0.0286 | 9.289 |
| 1.0 | 0.0385 | 0.0175 | 0.0049 | 3.534 |
| | Toluene as Solvent | | | |
| 0.1 | 7.2381 | 10.333 | 0.9733 | 10.62 |
| 0.2 | 0.6721 | 0.7672 | 0.0850 | 9.024 |
| 0.5 | 0.0296 | 0.0201 | 0.0024 | 8.319 |
| 1.0 | 0.00255 | 0.0031 | 0.0008 | 3.683 |

DETAILED DESCRIPTION OF THE DRAWINGS

The method of the invention can be applied as FIG. 1 illustrates to known separation processes. In FIG. 1, based upon a work up of burned out fuel elements for the separation of uranium and plutonium (neptunium) and the subsequent separation of the trivalent actinides americium and curium from the HAW (purex raffinate) has been shown, as a separation process can be schematically explained:

The burned out fuel elements can be fed to a PUREX process in which the U, PU and NP are removed. The highly effective liquid waste (HAW) is fed to a separation of the actinides III and lanthanides (III).

The separated actinides(III) and lanthanides(III) are then subjected to a selective actinide(III) separation which, for example, is carried out in accordance with the process according to European Patent 1019552. Following the process according to European Patent 1019552, in the aqueous phase (for example, trivalent ions of ions (Cer), (Ce), Praseodymium (Pr), Neodymium (Nd), Promethium (Pr), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu), as well as Lanthanum (La) and Yttrium (Y) or at least one component of this group and ions of the trivalent actinides like Americium (Am) and Curium (Cm) are contained. The aqueous phase has a low pH value which corresponds to an H+ concentration of a strong acid of 0.01 to 2 moles per liter. As the acid, HcL, $H_2SO_4$ and especially $HNO_3$ forms easily soluble salts. The extraction is carried out by means of an organic solvent which contains bis(aryl)dithiophosphinic acid and of the general formula (4)

(4)

where R1=phenyl or naphthyl and
R2=phenyl or naphthyl.
As well as methyl-, ethyl-, propyl-, isopropyl-, cyano-, nitro-, halogenyl-, (Cl—, F—, Br—, I—) substituted residues of $R_1$ and $R_2$ can be substituted with at least one of the components from the group of methyl-, ethyl-, propyl-, isopropyl-, cyano-, nitro-, halogenyl-, (Cl—, F—, Br—, I—). These groups are substituents which can cause an increase in the acidicity of the extraction agent bis(aryl)dithiophosphinic acid and leads to good extraction properties. The increased acidity of the extraction agent is decisive and the exact positions of the substituents are of less significance. For example, the organic phase contains at least one synergist from the group comprised of trioctyl phosphate (Formula 6), Tris-(2-ethylhexyl)-phosphate (Formula 7) and Tris-(2-propylpentyl)-phosphate (Formula 8).

$$(CH3CH2CH2CH2CH2CH2CH2CH2\text{—}O)_3P\text{=}O \tag{6}$$

$$\begin{array}{c}CH2CH3\\|\\(CH3CH2CH2CH2CHCH2\text{—}O)_3P\text{=}O\end{array} \tag{7}$$

$$\begin{array}{c}CH2CH3CH3\\|\\(CH3CH2CH2CHCH2\text{—}O)_3P\text{=}O\end{array} \tag{8}$$

However, also the synergists of the general formulas 5 can be used.

With the addition of synergists, a significant increase in the separation factor SF is achieved. The selectivity in the separation of the actinides from the lanthanides is significantly increased.

The organic solvent is advantageously an aromatic component like benzene containing solvent or a pure aromatic solvent. In an especially advantageous feature of the invention, the solvent includes at least one group of Toluene, Xylene, Tertiary Butylbenzene, Propylene or Isopropylbenzene, bis or tris benzene. The use of a solvent has two additional positive effects:

Firstly, the selectivity of the An$^{3+}$ extraction is further advanced. The other is that the distribution coefficient $_{Dan}$(III) is additionally improved.

The effect on the separation factor SF and the distribution coefficient follows the series: Benzene, Toluene, Xylene, Tertiary Butylbenzene, Bis-(isopropyl)-benzene, tri-isopropylbenzene, Tris-(tertiary butyl)-benzene.

In the following, the separation of Americium(III) and Curium(III) with the process of the invention is described.

Figure 2:
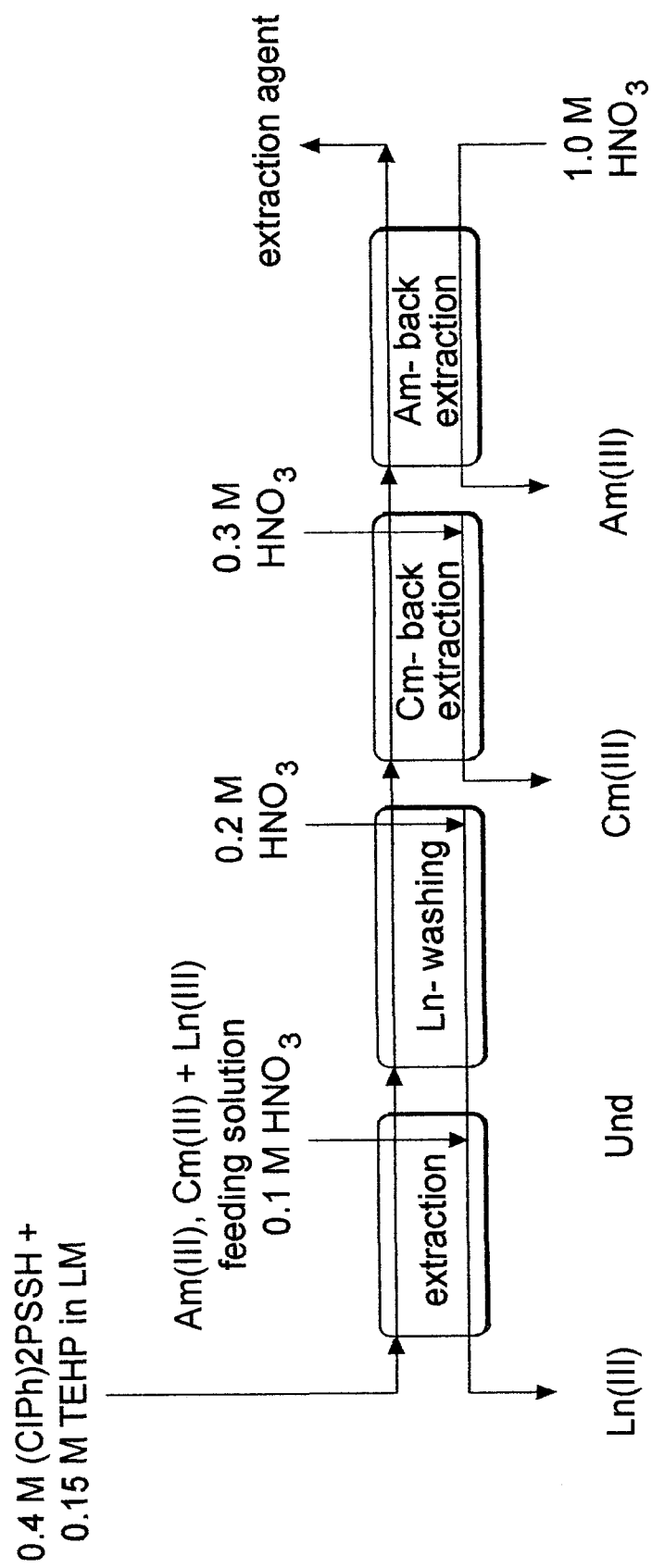
FIG. 2 is a flow diagram of a process made in which the two cations Americium (III) and Curium (III) are initially removed together from a lanthanide solution and then the Americium (III) is separated from the Curium (III).

A process according to the method of the invention has been given for example in FIG. 2.

FIG. 2 shows a separation utilizing the Luca process for actinide(III)/lanthanide(III) separation followed by Americium/Curium separation.

In this illustration the actinides (III) are extracted from an aqueous solution containing Americium(III) and Curium(III) as well as lanthanide (III) with 0.1 mole per liter HNO$_3$ using an extraction agent comprised of 0.4 mole per liter (ClPH)$_2$ PSSH and 0.15 mole per liter and trisethylhexylphosphate in an organic phosphate. With a 0.3 mole per liter HNO$_3$ solution Curium(III) is then re-extracted. Thereafter follows the back extraction of Americium(III) with 1.0 mole per liter HNO$_3$.

The flow scheme is as follows:

1. Selective extraction of Americium and Curium. The lanthanides Ln(III) here, Y, La, Ce, Pr, Nd, Sm, Eu and Gd remain in the raffinate (in the figure=Ln(III).
2. Selective stripping of Cm(III).
3. Stripping of Am(III).

The invention claimed is:

1. A method of separating trivalent Americium from trivalent Curium contained in an acidic aqueous solution having at least these cations, and individually recovering the trivalent Americium and the trivalent Curium, which comprises the steps of:

(a) contacting the acidic aqueous solution with an acid concentration of 0.01 moles per liter to 1.0 mole per liter with an organic solvent containing a bis(aryl)dithiophosphinic acid of the Formula (4)

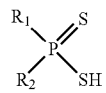
(4)

wherein

R$_1$ and R$_2$ are each phenyl or naphthyl, unsubstituted or substituted by at least one methyl, ethyl, propyl, isopropyl, cyano, nitro, halo, substituent and with a synergist of the formula (5)

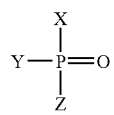
(5)

wherein

X, Y and Z are each R or RO, where R is a branched or unbranched alkyl, to selectively extract from the acidic aqueous solution, the trivalent Americium and the trivalent Curium, leaving behind as a raffinate, the acidic aqueous solution;

(b) selectively stripping the trivalent Curium from the organic solvent containing the trivalent Americium and the trivalent Curium with 0.3 molar nitric acid leaving behind the organic solvent containing the trivalent Americium; and (c) stripping the trivalent Americium from the organic solvent with 1.0 molar nitric acid.

2. The method according to claim 1 wherein the organic solvent is an aromatic solvent, an aliphatic solvent, or a mixture thereof.

3. The method according to claim 2 wherein the aromatic solvent is selected from at least one member of the group consisting of benzene, toluene, tertiary butyl benzene, isopropyl benzene, bis(isopropyl)benzene and tri(isopropyl)benzene.

4. The method according to claim 2 wherein the aliphatic solvent is selected from at least one member of the group consisting of branched and unbranched aliphatic solvents having a chain length of C5 to C14.

5. The method according to claim 4 wherein the aliphatic solvent is selected from at least one member of the group consisting of n-hexane, cyclohexane, heptane, octane, nonane, decane, undecane, dodecane, kerosene, and TPH.

6. The method according to claim 2 wherein the aliphatic solvent is a main solvent component.

7. The method according to claim 1, wherein prior to contacting the aqueous acid solution containing the trivalent Americium and the trivalent Curium with the organic solvent and with the synergist, the trivalent Americium and the trivalent Curium are separated from any lanthanides in the aqueous acid solution.

8. The method according to claim 7 wherein the trivalent Americium and the trivalent Curium are separated from the lanthanides in aqueous acid solution by a Talspeak, TRUEX, TRPO, or Diamex process.

9. The method according to claim 7 wherein the trivalent Americium and the trivalent Curium are separated from the lanthanides by extraction with an organic solvent containing a bis(aryl)dithiophosphinic acid of the formula (4)

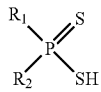

(4)

wherein

R$_1$ and R$_2$ are each phenyl or naphthyl, unsubstituted or substituted by at least one methyl, ethyl, propyl, isopropyl, cyano, nitro, halo, substituent and with a synergist of the formula (5)

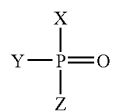

(5)

wherein

X, Y and Z are each R or RO, where R is a branched or unbranched alkyl.

* * * * *